(12) United States Patent
Hu

(10) Patent No.: US 10,712,842 B2
(45) Date of Patent: Jul. 14, 2020

(54) TOUCH DISPLAY AND CONTROL MODULE OF SAME

(71) Applicant: Touchplus Information Corp., New Taipei (TW)

(72) Inventor: Shih-Hsien Hu, New Taipei (TW)

(73) Assignee: TOUCHPLUS INFORMATION CORP., New Taipei (TW)

( * ) Notice: Subject to any disclaimer, the term of this patent is extended or adjusted under 35 U.S.C. 154(b) by 1279 days.

(21) Appl. No.: 14/516,948

(22) Filed: Oct. 17, 2014

(65) Prior Publication Data

US 2015/0109225 A1 Apr. 23, 2015

Related U.S. Application Data

(60) Provisional application No. 61/892,596, filed on Oct. 18, 2013.

(51) Int. Cl.
| | |
|---|---|
| *G06F 3/041* | (2006.01) |
| *G06F 3/038* | (2013.01) |
| *G09G 5/00* | (2006.01) |
| *G06F 3/14* | (2006.01) |

(52) U.S. Cl.
CPC .............. *G06F 3/041* (2013.01); *G06F 3/038* (2013.01); *G06F 3/0416* (2013.01); *G09G 5/003* (2013.01); *G06F 3/14* (2013.01); *G09G 2320/08* (2013.01); *G09G 2340/12* (2013.01); *G09G 2370/20* (2013.01)

(58) Field of Classification Search
CPC ........................................................ G06F 3/041
See application file for complete search history.

(56) References Cited

U.S. PATENT DOCUMENTS

2013/0076675 A1* 3/2013 Shin ...................... G06F 3/0416
345/173

* cited by examiner

*Primary Examiner* — William Boddie
(74) *Attorney, Agent, or Firm* — WPAT, PC

(57) ABSTRACT

A touch display in communication with at least one external electronic device through an external signal cable or a wireless transmission channel is provided. The touch display includes a display module, a touch panel formed on the display module and a control module. The control module is in communication with the touch panel, the display module and the external electronic device. The control module generates touch information in response to touch operation on the touch panel, and converts the touch information into a control instruction. The touch information or the control instruction is transmitted to the external electronic device through the external signal cable or the wireless transmission channel to operate the external electronic device.

15 Claims, 3 Drawing Sheets

TOUCH DISPLAY AND CONTROL MODULE OF SAME

CROSS-REFERENCE TO RELATED APPLICATIONS

The present application is a nonprovisional application claiming benefit from a prior-filed provisional application bearing a Ser. No. 61/892,596 and filed Oct. 18, 2013, the entity of which is incorporated herein for reference.

FIELD OF THE INVENTION

The present disclosure relates to a display device, and particularly to a touch display and a control module thereof.

BACKGROUND OF THE INVENTION

With rapid development of touch sensing technology, many electronic devices such as mobile phones, notebook computers or tablet computers take advantage of touch devices to provide intuitive operation and easy human-machine interface. These electronic devices hugely enter modern lives and great business opportunities are created. There are two known touch sensing technologies, i.e. capacitive sensing and resistive sensing.

For capacitive sensing, when the touch device is touched with a human finger or a conductive object, a capacitor is temporarily formed on the electrode corresponding to the touched position. Therefore, equivalent capacitance of the corresponding electrode changes. A sensor circuit can determine the touched position on the touch device according to the equivalent capacitance change of the corresponding electrode.

For resistive sensing, when an object such as a human finger or a stylus presses down onto a surface of the touch device, the upper electrode and the lower electrode are electrically connected at the pressed position so that the electrodes behave as a voltage divider circuit. Therefore, the sensor circuit can determine the pressed position on the touch device according to the voltage change of the upper electrode and the lower electrode.

Since large-area flat-panel display gains popularity now and touch sensing technology is widely used as the most friendly human-machine interface, there is an increased demand for large-area touch display these days. In a manufacturing process of a conventional touch display, a touch panel and a display module are separately produced and then the touch panel is laminated on or attached to the display module. The touch panel and the display module are controlled by two separate and independent chips without effective communication therebetween. Therefore, the application of the touch display is limited.

The conventional touch display can not cooperate with various electronic devices. For example, if a touch display is designed for personal computers, the dedicated touch display only supports personal computers with specific operating system (OS). The touch panel laminated on the dedicated touch display is just viewed as an additional input device other than a mouse or keyboard. Hence, the touch display just functions to display images (with the display module) and transmit touch signals in response to user touch operations to the personal computer (with the touch panel). Through the touch display, interaction between the user and the personal computer is still not satisfied.

Therefore, a novel touch display with improved interactive function is desired.

SUMMARY OF THE INVENTION

An aspect of the present disclosure provides a touch display which is in communication with at least one external electronic device through an external signal cable or a wireless transmission channel. The touch display includes a display module, a touch panel formed on the display module and a control module. The control module is in communication with the touch panel, the display module and the external electronic device. The control module generates touch information in response to touch operation on the touch panel, and converts the touch information into a control instruction. The control instruction or the touch information is transmitted to the external electronic device through the external signal cable or the wireless transmission channel to operate the external electronic device.

In an embodiment, the control module includes a first control chip and a second control chip. The first control chip is in communication with the touch panel and a first external electronic device. The first control chip generates the touch information in response to the touch operation on the touch panel. The second control chip is in communication with the display module, the first control chip, the first external electronic device and a second external electronic device. The second control chip converts the touch information into a first control instruction to operate the first external electronic device or the second external electronic device.

In an embodiment, the first control chip includes an analog-to-digital converter and a first microcontroller. The analog-to-digital converter is in communication with the touch panel, while the first microcontroller is in communication with the analog-to-digital converter, the second control chip and the first external electronic device. The analog-to-digital converter generates the touch information in response to the touch operation on the touch panel when video signals from the first external electronic device are shown on the display module, and the first microcontroller converts the touch information into a second control instruction to operate the first external electronic device.

In an embodiment, the first control chip includes an analog-to-digital converter and a first microcontroller. The analog-to-digital converter is in communication with the touch panel, while the first microcontroller is in communication with the analog-to-digital converter, the second control chip and the first external electronic device. The analog-to-digital converter generates the touch information in response to the touch operation on the touch panel when video signals from the first external electronic device are shown on the display module, and the first microcontroller transmits the touch information to the second control chip.

In an embodiment, the second control chip includes an on-screen display (OSD) module and a second microcontroller. The OSD module generates an OSD image shown on the display module to assist the touch operation. The second microcontroller is in communication with the first microcontroller, the OSD module, the display module, the first external electronic device and the second external electronic device. The second microcontroller converts the touch information into the first control instruction to operate the first external electronic device or the second external electronic device.

In an alternative embodiment, the touch display includes a first control chip and a second control chip. The first control chip is in communication with the touch panel, while the second control chip is in communication with the display module, the first control chip and the external electronic device. The first control chip generates the touch information in response to the touch operation on the touch panel. The second control chip converts the touch information into the control instruction to operate the external electronic device.

In an embodiment, the first control chip includes an analog-to-digital converter which is in communication with the touch panel and configured to generate the touch information in response to the touch operation on the touch panel. The second control chip includes an OSD module and a microcontroller. The OSD module generates an OSD image shown on the display module to assist the touch operation. The microcontroller is in communication with the analog-to-digital converter, the OSD module, the display module and the external electronic device. The microcontroller converts the touch information into the control instruction to operate the external electronic device.

In an embodiment, the external electronic device is a computer system, a smart phone, a TV signal source or a portable storage device.

In an embodiment, the touch display further includes a remote controller in communication with the control module. The remote controller issues a remote control signal to the control module, and then the control module converts the remote control signal into a remote control instruction to operate the external electronic device.

Another aspect of the present disclosure provides a touch display in communication with a first external electronic device and a second external electronic device. The touch display includes a display module, a touch panel formed on the display module and a control module. The control module includes a first control chip and a second control chip. The first control chip is in communication with the touch panel and the first external electronic device, and configured to generate touch information in response to touch operation on the touch panel. The second control chip is in communication with the display module, the first control chip, the first external electronic device and the second external electronic device, and configured to convert the touch information into a control instruction. The touch information or the control instruction is transmitted to the first external electronic device or the second external electronic device to operate the first external electronic device or the second external electronic device.

In an embodiment, the second control chip is a video chip for receiving video signals from the first external electronic device or the second external electronic device and converting the video signals into video-display signals to be shown on the display module.

Another aspect of the present disclosure provides a control module of a touch display which includes a display module and a touch panel and is in communication with a first external electronic device and a second external electronic device. The control module includes: a first control chip, in communication with the touch panel and the first external electronic device, configured to generate touch information in response to touch operation on the touch panel; and a second control chip, in communication with the display module, the first control chip, the first external electronic device and the second external electronic device, configured to convert the touch information into a control instruction. The touch information or the control instruction is transmitted to the first external electronic device or the second external electronic device to operate the first external electronic device or the second external electronic device.

In an embodiment, the control module is cooperated with a remote controller of the touch display. The remote controller issues a remote control signal to the control module, and then the control module converts the remote control signal into a remote control instruction to operate the first external electronic device or the second external electronic device.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
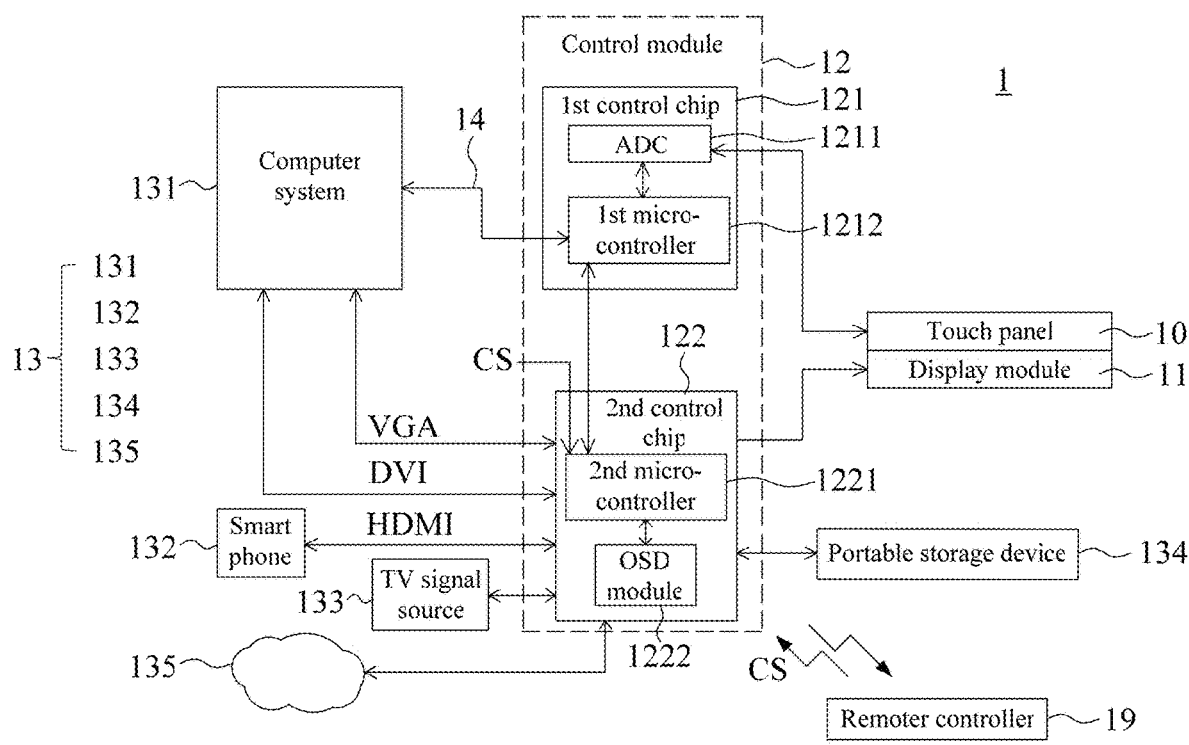
FIG. 1 is a functional block diagram illustrating a touch display according to an embodiment of the present invention.

Please refer to FIG. 1, a functional block diagram illustrating a touch display according to an embodiment of the present invention. The touch display 1 is a flat-panel display (e.g. a liquid crystal display (LCD)) with touch sensing function. The touch display 1 is in communication with at least one external electronic device 13 wherein the term "communication" in the specification means that two terminals are electrically connected to each other or communicated to each other through an (external) signal cable/signal line or a wireless transmission channel by means of any possible transmission media (e.g. electrical, radio or optical signals) and any possible communication protocol. The touch display 1 includes a touch panel 10, a display module 11 and a control module 12. By means of the control module 12, the external electronic device 13 can be controlled or operated through user touch operations on the touch panel 10. The external electronic devices 13 may include, but is not limited to, a computer system 131 (e.g. a personal computer, a notebook computer or a tablet computer), a smart phone 132, a TV signal source 133, a portable storage device 134 or a remote electronic device in communication with Internet 135. The touch panel 10 is formed on a surface of the display module 11. Alternatively, the touch panel 10 may be integrated with the display module 11, and the relative details may be obtained by referring to the following description.

The control module 12 is in communication with the touch panel 10, the display module 11 and the external electronic device 13. When a user performs touch operation on the touch panel 10, e.g. tap, drag, swipe, or pinch/stretch, the control module 12 generates touch information and then converts the touch information into a control instruction to control and operate the external electronic device 13. However, if the external electronic device 13 is capable of converting the touch information to the control instruction, the control module 12 may directly transmit the touch information to the external electronic device 13.

In an embodiment, the control module 12 includes a first control chip 121 and a second control chip 122. The first control chip 121 is in communication with the touch panel 10 and a first external electronic device. The first control chip 121 generates corresponding touch information in response to the touch operation on the touch panel 10. The second control chip 122 is in communication with the display module 11, the first control chip 121, the first external electronic device and a second external electronic device. In this embodiment, the first external electronic device is the computer system 131 and the second external electronic device is at least one of the smart phone 132, the TV signal source 133, the portable storage device 134 and the remote electronic device in communication with the Internet 135.

In an embodiment, the first control chip 121 includes an analog-to-digital converter (ADC) 1211 and a first microcontroller 1212. The analog-to-digital converter 1211 is in communication with the touch panel 10 and the first microcontroller 1212 and configured to sense the touch operation on the touch panel 10 and generate the corresponding touch information in response to the touch operation. For example, the touch information may include raw data of, but is not limited to, coordinates of a single-touch point or multi-touch points, moving direction and speed of the touch point(s) and a multi-touch gesture. The moving direction and speed and a multi-touch gesture may be obtained by calculating on coordinate changes of the touch points during a specific time periods. The obtained multi-touch gestures may be pre-defined motions or touch operations such as tapping, double tapping, pressing, scrolling, panning, flicking, pinching, zooming and rotating, etc. The touch information from the analog-to-digital converter 1211 is converted into a control instruction such as a computer instruction by the first microcontroller 1212. The control instruction is then transmitted to the computer system 131 with specific operating system (OS) to control and operate the computer system 131 through a signal channel 14 in a wired manner, e.g. universal serial bus (USB), inter-integrated circuit (I²C), universal asynchronous receiver/transmitter (UART) or in a wireless manner. Since the computer system 131 is capable of converting the touch information into the control instruction, the control module 12 may transmit the touch information (raw data) to the computer system 131. The computer system 131 then converts the touch information into proper control instruction to control itself.

The second control chip 122 corresponding to the display module 11 is a video chip such as scaler chip. The second control chip 122 receives video signals from various video sources, for example, video graphics array (VGA) signals or digital visual interface (DVI) signals from the computer system 131, high-definition multimedia interface (HDMI) signals from the smart phone 132, TV signals from the TV signal source 133 (e.g. TV cable or antenna for broadcast television, set-top box or TV stick), steaming media from the Internet 135, video files in the portable storage devices 134 (e.g. USB flash drive) inserted to a USB socket (not shown) of the touch display 1, or video files stored in an internal storage device (not shown) of the display module 11. The second control chip 122 selects at least one kind of the video signals to be displayed and generates corresponding video-display signals (e.g. low-voltage differential signaling (LVDS)) supported by the display module 11.

In an embodiment, the second control chip 122 includes a second microcontroller 1221 and an on-screen display (OSD) module 1222. The second microcontroller 1221 is in communication with the display module 11, the first microcontroller 1212 and the OSD module 1222. The second microcontroller 1221 receives the touch information generated by the analog-to-digital converter 1211 through the first microcontroller 1212 and then generates a control instruction to operate or control the first external electronic device or the second external electronic device, e.g. the computer system 131, the smart phone 132, the TV signal source 133, the portable storage device 134 or the remote electronic device in communication with the Internet 135. If these external electronic devices can process the touch information (raw data) rather than passively receive the control instruction, the control module 12 can transmit the touch information to these external electronic devices no matter whether control instructions have been generated by the control module 12. Furthermore, the second microcontroller 1221 may receive a control signal CS issued from a remote controller 19 or generated in response to a key press on the display module 11 to control the display module 11, e.g. volume control or channel switch.

Figure 2:
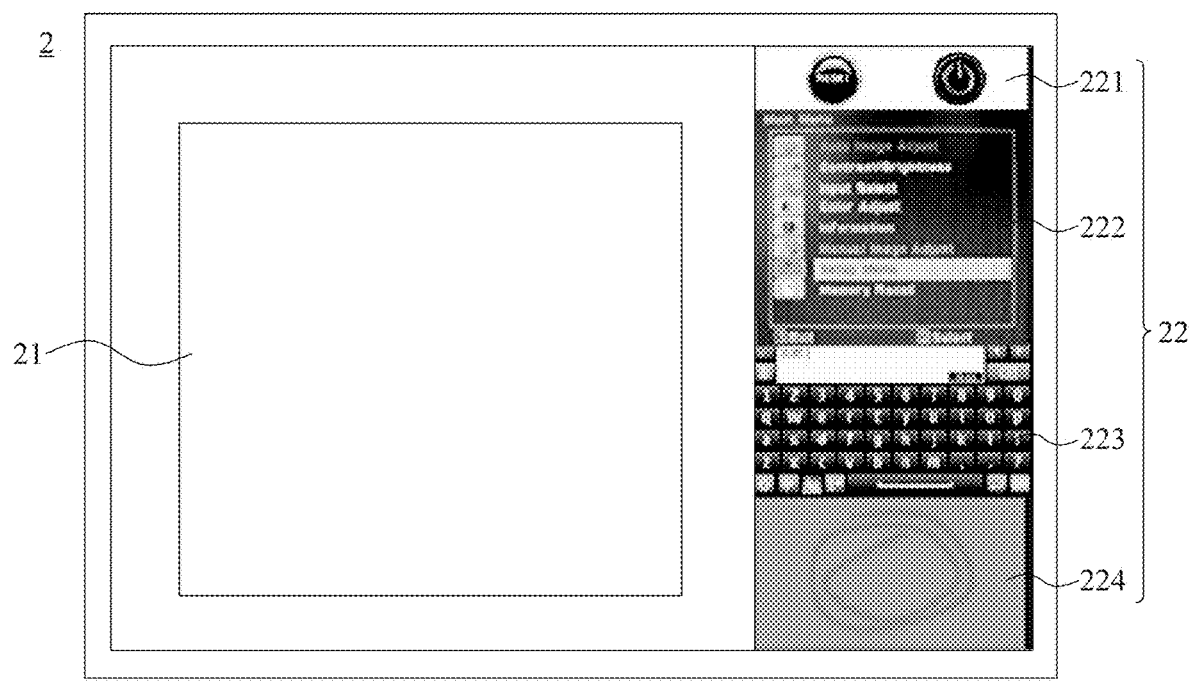
FIG. 2 is a schematic diagram illustrating a frame shown on the touch display.

The OSD module 1222 is configured to generate an OSD image to be superimposed on or shown with display images. FIG. 2 illustrates a frame 2 shown on the display module 11. For example, the frame 2 includes a video-display frame 21 and an OSD image 22. The video-display frame 21 represents the video signals from various video sources as described above. The OSD image may include, but is not limited to, an OSD hot key 221, an OSD menu 222, an OSD virtual keyboard 223 and an OSD virtual touch pad 224. The OSD image 22 can assist touch operation, for example, simulating various input modes. It is to be noted that the relative positions of the video-display frame 21 and the OSD image 22 are not limited to the positions as shown in FIG. 2.

Several examples of control methods with respect to the video-display frame 21 or the OSD image 22 are given in the following paragraphs.

When the video-display frame 21 represents the video signals from the computer system 131, and the user performs touch operation on the touch panel 10 corresponding to the video-display frame 21, the corresponding touch information generated by the analog-to-digital converter 1211 of the first control chip 121 is converted into a control instruction by the first microcontroller 1212. Then the control instruction is transmitted to the computer system 131 through the signal channel 14 in a wired or wireless manner. The computer system 131 responds to the control instruction. Hence, the playback of the video signals is controlled through the touch display 1. Alternatively, the touch information may be transmitted to the computer system 131 through the first microcontroller 1212 without conversion because the computer system 131 is capable of converting the touch information into the control instruction of its own.

When the video-display frame 21 represents the video files stored in the portable storage device 134 or the internal storage of the display module 11, and the user performs touch operation on the touch panel 10 corresponding to the video-display frame 21, the touch information generated by the analog-to-digital converter 1211 of the first control chip 121 corresponding to the touch panel 10 is transmitted to the second microcontroller 1221 of the second control chip 122 through the first microcontroller 1212 for further processing. Therefore, the playback of the video files can be controlled through the touch operation on the touch display 1 instead of key press on the touch display 1 or remote control through the remote controller 19.

In a similar way, the video-display frame 21 may represent the video signals from the smart phone 132, the TV signal source 133, the remote electronic device communicated with the Internet 135 or other external electronic device. The user may perform touch operation on the touch panel 10 of the touch display 1 to control the playback of the video signals. Furthermore, the video-display frame 21 may represent the video signals from more than one video signal source simultaneously. For the playback of the video signals from different video sources simultaneously, the video-display frame 21 may be in a split screen mode, a picture-in-picture (PIP) mode, a window mode or a tile mode. For control the playback of specific video signals, the user may touch the corresponding sub-frame, split screen, picture, window or tile at first to initiate the touch operation. Since large-area touch display is gone into mass production and widely used, it is not a problem to display different video signals simultaneously. The application can even turn the user habit in the near future.

When the user performs touch operation on the touch panel 10 corresponding to the OSD image 22 of the frame 2, the touch information generated by the analog-to-digital converter 1211 of the first control chip 121 is transmitted to the second microcontroller 1221 of the second control chip 122 through the first microcontroller 1212. Thus, the user can control the touch display 1 by referring to the OSD image 22, e.g. the OSD menu 222 to control or operate the display module 11 to perform specific function.

Furthermore, upon receiving the touch information generated in response to the touch operation on the touch panel 10 corresponding to the OSD image 22, e.g. the OSD hot key 221, the OSD menu 222, the OSD virtual keyboard 223 or the OSD virtual touch pad 224, the second microcontroller 1221 generates the control instruction which is then sent to the external electronic device such as the computer system 131 or the smart phone 132 through the signal channel 14 or the external signal cable/wireless transmission channel for DVI signals or HDMI signals so as to control or operate the computer system 131 or the smart phone 132 with specific operating system. Taking the OSD hot key 221 as an example, the computer system 131 or the smart phone 132 can be shut down, powered on or reset in response to the touch operation on the touch panel 10 corresponding to the OSD hot key 221. The OSD virtual keyboard 223 and the OSD virtual touch pad 224 may be viewed as a normal input device to be operated by the user to create interaction between the external electronic device 13 and the user.

The remote controller 19 is in communication with the control module 12. The remote controller 19 is a wireless remote controller coupled to a wireless receiver (not shown) of the touch display 1. The remote controller 19 issues a remote control signal to the control module 12 and the control module 12 converts the remote control signal to a remote control instruction to operate or control the external electronic device 13. For example, the remote control signal may include a move up/down/left/right signal and a selection signal to control a cursor on the touch display 1 to move to a specific position and select a specific function. Therefore, the touch display 1 of the present application functions as a control center or a major human-machine interface to control various external electronic devices 13. Only one remote controller 19 for the touch display 1 is required, and many remote controllers for different external electronic devices which usually confuse the user are no longer required. User manuals indicating how to use the many remote controllers to achieve specific function of the corresponding external electronic devices 13 can be substituted by video presentation or prompting message on the touch display 1 to simplify the operation. Furthermore, no remote controller is required and the touch display 1 itself may be considered as a remoter control device.

Figure 3:
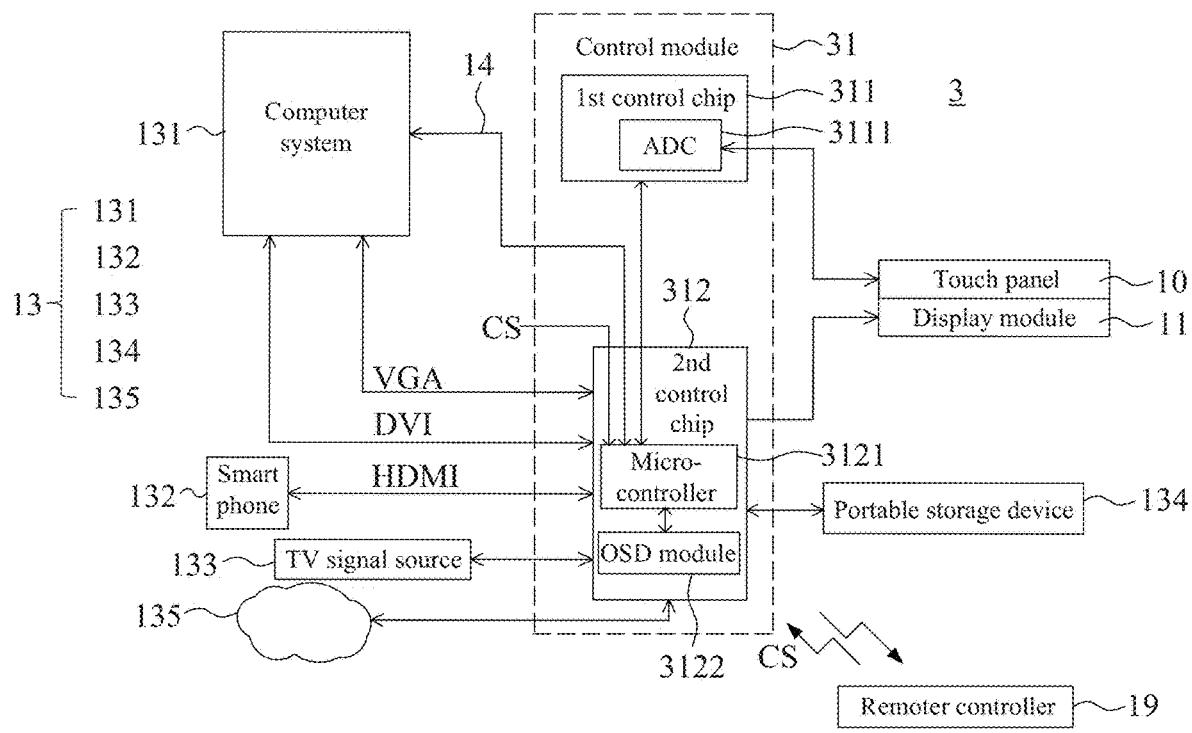
FIG. 3 is a functional block diagram illustrating a touch display according to another embodiment of the present invention.

Please refer to FIG. 3, a functional block diagram illustrating a touch display according to another embodiment of the present invention. The touch display 3 includes a touch panel 10, a display module 11 and a control module 31. The touch display 3 is in communication with at least one external electronic device 13. Compared with the above-described embodiment with reference to FIG. 1, the first microcontroller 1212 of the first control chip 121 is integrated to the second microcontroller 1221 of the second control chip 122. In other words, the control module 31 includes a first control chip 311 and a second control chip 312 wherein the first control chip 311 includes an analog-to-digital converter 3111 while the second control chip 312 includes a microcontroller 3121 and an OSD module 3122. Such design reduces hardware cost. The analog-to-digital converter 3111 is in communication with the touch panel 10 and configured to sense the touch operation on the touch panel 10 and generate the corresponding touch information in response to the touch operation. The touch information is transmitted to the microcontroller 3121 of the second control chip 312 through a serial interface or a parallel bus interface. For example, four pins SS, CLK, MOSI and MISO of a serial peripheral interface (SPI) or twelve pins CS, ALE, RD, WR, AD0~AD7 of a 8-bit external bus interface (EBI) are used to transmit the touch information. Then, the microcontroller 3121 generates a corresponding control instruction upon receiving the touch information to control or operate the at least one external electronic device 13, e.g. the computer system 131, the smart phone 132, the TV signal source 133, the portable storage device 134 or the remote electronic devices in communication with the Internet 135.

In conclusion, the control module and the touch display of the present application generate corresponding touch information in response to touch operation, and convert the touch information into a control instruction wherein the touch information or the control instruction is transmitted to the external electronic device to control or operate the external electronic devices. The control module and the touch display provide a friendly human-machine interface and an intuitive graphical interface to assist in operating various external electronic devices. Mass production of large-area touch displays, improved manufacturing process of touch devices and people getting more and more familiar with touch operation these years are especially beneficial to the present application. Taking advantage of the control module, the touch display functions as both an output device and an input device to achieve interactive operation. Therefore, the operations of the external electronic devices are integrated. Thus, the touch display becomes a control center with increased operation efficiency.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch display in communication with a first external electronic device and a second external electronic device through an external signal cable or a wireless transmission channel, the touch display comprising:
   a display module;
   a touch panel formed on the display module; and
   a control module, in communication with the touch panel, the display module and the external electronic devices, configured to generate first touch information in response to first touch operation on a first area of the touch panel, generate second touch information in response to second touch operation on a second area of the touch panel, and convert the second touch information into a first control instruction, the first touch information being transmitted to the first external electronic device through the external signal cable or the wireless transmission channel to operate the first external electronic device, the first control instruction being transmitted to the second external electronic device through the external signal cable or the wireless transmission channel to operate the second external electronic device.

2. The touch display according to claim 1, wherein the control module comprises:
   a first control chip, in communication with the touch panel and the first external electronic device, configured to generate the first touch information in response to the first touch operation on the first area of the touch panel, and generate the second touch information in response to the second touch operation on the second area of the touch panel; and
   a second control chip, in communication with the display module, the first control chip, the first external electronic device and the second external electronic device, configured to convert the second touch information into the first control instruction to operate the second external electronic device.

3. The touch display according to claim 2, wherein the first control chip comprises:
   an analog-to-digital converter in communication with the touch panel; and
   a first microcontroller in communication with the analog-to-digital converter, the second control chip and the first external electronic device,
   the analog-to-digital converter generating the first touch information in response to the first touch operation on the first area of the touch panel when video signals from the first external electronic device are shown on the display module, and the first microcontroller converting the first touch information into a second control instruction to operate the first external electronic device.

4. The touch display according to claim 2, wherein the first control chip comprises:
   an analog-to-digital converter in communication with the touch panel; and
   a first microcontroller in communication with the analog-to-digital converter, the second control chip and the first external electronic device,
   the analog-to-digital converter generating the second touch information in response to the second touch operation on the second area of the touch panel when video signals from the second external electronic device are shown on the display module, and the first microcontroller transmitting the second touch information to the second control chip.

5. The touch display according to claim 4, wherein the second control chip comprises:
   an on-screen display (OSD) module configured to generate an OSD image shown on a third area of the display module corresponding to the second area of the touch panel to assist the touch operation; and
   a second microcontroller in communication with the first microcontroller, the OSD module, the display module, the first external electronic device and the second external electronic device, configured to convert the second touch information into the first control instruction to operate the second external electronic device.

6. The touch display according to claim 1, wherein the control module comprises:
   a first control chip, in communication with the touch panel, configured to generate the first touch information in response to the first touch operation on the first area of the touch panel, and generate the second touch information in response to the second touch operation on the second area of the touch panel; and
   a second control chip, in communication with the display module, the first control chip and the external electronic devices, configured to transmit the first touch information to the first external electronic device to operate the first external electronic device, and convert the second touch information into the first control instruction to operate the second external electronic device.

7. The touch display according to claim 6, wherein the first control chip comprises an analog-to-digital converter in communication with the touch panel, configured to generate the first touch information in response to the first touch operation on the first area of the touch panel and generate the second touch information in response to the second touch operation on the second area of the touch panel.

8. The touch display according to claim 7, wherein the second control chip comprises:
   an OSD module configured to generate an OSD image shown on a third area of the display module corresponding to the second area of the touch panel to assist the touch operation; and
   a microcontroller in communication with the analog-to-digital converter, the OSD module, the display module and the external electronic devices, configured to transmit the first touch information to the first external electronic device to operate the first external electronic device and convert the second touch information into the first control instruction to operate the second external electronic device.

9. The touch display according to claim 1, wherein each of the external electronic devices is a computer system, a smart phone, a TV signal source or a portable storage device.

10. The touch display according to claim 1, further comprising a remote controller in communication with the control module, configured to issue a remote control signal to the control module, the control module converting the remote control signal into a remote control instruction to operate the first external electronic device or the second external electronic device.

11. A touch display in communication with a first external electronic device and a second external electronic device, the touch display comprising:
   a display module;
   a touch panel formed on the display module; and
   a control module, comprising:
      a first control chip, in communication with the touch panel and the first external electronic device, configured to generate first touch information in response to first touch operation on a first area of the touch panel and generate second touch information in response to second touch operation on a second area of the touch panel; and a second control chip, in communication with the display module, the first control chip, the first external electronic device and the second external electronic device, configured to convert the second touch information into a first control instruction, the control module transmitting the first touch information and the first control instruction to the first external electronic device and the second external electronic device to operate the first external electronic device and the second external electronic device, respectively.

12. The touch device according to claim 11, wherein the second control chip is a video chip configured to receive video signals from at least one of the first external electronic device and the second external electronic device and convert the video signals into video-display signals to be shown on the display module.

13. The touch display according to claim 11, further comprising a remote controller in communication with the control module, configured to issue a remote control signal to the control module, the control module converting the remote control signal into a remote control instruction to operate the first external electronic device or the second external electronic device.

14. A control module of a touch display, the touch display comprising a display module and a touch panel and being in communication with a first external electronic device and a second external electronic device, the control module comprising:

a first control chip, in communication with the touch panel and the first external electronic device, configured to generate first touch information in response to first touch operation on a first area of the touch panel and generate second touch information in response to second touch operation on a second area of the touch panel; and a second control chip, in communication with the display module, the first control chip, the first external electronic device and the second external electronic device, configured to convert the second touch information into a first control instruction, the first touch information and the first control instruction being transmitted to the first external electronic device and the second external electronic device to operate the first external electronic device and the second external electronic device, respectively.

15. The control module according to claim 14, wherein the control module is cooperated with a remote controller of the touch display, the remote controller being in communication with the control module and configured to issue a remote control signal to the control module, the control module converting the remote control signal into a remote control instruction to operate the first external electronic device or the second external electronic device.

* * * * *